United States Patent [19]
Briceland

[11] Patent Number: 5,951,424
[45] Date of Patent: Sep. 14, 1999

[54] CONTINUOUSLY VARIABLE POWER TRANSMISSION

[75] Inventor: R. Wayne Briceland, Halifax, Canada

[73] Assignee: Briceland & Associates Limited, Halifax, Canada

[21] Appl. No.: 09/090,566

[22] Filed: Jun. 8, 1998

[51] Int. Cl.⁶ .................................................. F16H 47/04
[52] U.S. Cl. ............................................................ 475/72
[58] Field of Search ............................................... 475/72

[56] References Cited

U.S. PATENT DOCUMENTS

| | | |
|---|---|---|
| 2,390,240 | 12/1945 | De Lancey . |
| 3,345,885 | 10/1967 | Tschanz . |
| 3,665,788 | 5/1972 | Nyman . |
| 3,982,448 | 9/1976 | Polak et al. . |
| 4,823,640 | 4/1989 | Donnelly . |
| 5,052,986 | 10/1991 | Jarchow et al. . |

FOREIGN PATENT DOCUMENTS

| | | |
|---|---|---|
| 2679975 | 7/1991 | France . |
| 2179412 | 3/1987 | United Kingdom . |

*Primary Examiner*—Dirk Wright
*Attorney, Agent, or Firm*—Oyen Wiggs Green & Mutala

[57] ABSTRACT

A transmission can convert a single speed, single rotary directional input, to a continuously variable clockwise or anticlockwise directional output. This effect can be achieved without disengaging the output shaft from the input shaft. The transmission includes a pair of epicycloidal gear trains having sun gears on a common shaft. A ring gear in the first gear train drives a planet gear in the second gear train. A variable speed drive drives a planet gear in the first drive train. The transmission has particular application in vehicles which require an engine to operate at or close to an optimum speed to match its operational requirements. Similarly engines such as turbines or electric motors which can operate efficiently within a speed range and with a single rotational direction can be used with the transmission to provide power to systems requiring a variety of speeds and reversing characteristics.

17 Claims, 4 Drawing Sheets

CONTINUOUSLY VARIABLE POWER TRANSMISSION

FIELD OF THE INVENTION

This invention relates to a power transmission system and, in particular, to a continuous mesh geared power transmission system that provides a continuously variable transmission ratio.

DESCRIPTION OF THE PRIOR ART

It has long been sought to provide, particularly for use in automobile transmissions, a power transmission that operates at high efficiency while providing a drive ratio which is continuously variable over a wide range. Most vehicular engines are optimally efficient when operating at a particular number of revolutions per minute ("r.p.m."). A continuously variable transmission would permit the engine to be run at its optimal r.p.m. while smoothly varying the road speed of the vehicle.

Presently used automobile transmissions, whether of the gear change or so-called automatic type, provide only a few transmission ratios. Each of the transmission ratios can be selected by coupling or uncoupling various gear drive paths through the transmission. Because such transmissions provide only a few spaced gear ratios it is not possible to operate the vehicle engine at its optimal r.p.m. all of the time.

Numerous attempts to provide a continuously variable drive transmission have been made, and examples can be seen in U.S. Pat. No. 4,304,154 Townend, U.S. Pat. No. 4,756,211 Fellows and U.S. Pat. No. 5,074,930 Perry. Such transmissions typically obtain a continuous variation in the transmission ratio by employing rotating discs or the like which cooperate with annular race surfaces which contact opposite edge portions of the discs, the discs being adjustable in position to vary the radius at which they contact the races, and thus vary the drive ratio. In such arrangements power is transmitted through frictional contact between the discs and the races. Such transmissions have limited power transmission capabilities and must be operated under high contact pressure, so that wear and reliability problems can arise. Moreover, such known transmissions are further limited in that they require a separately engageable gear path to provide a reverse drive.

Other continuously variable transmissions, particularly as employed in recreational vehicles, utilize a belt drive passing over variable diameter pulleys. These do not provide the desired positive drive characteristics of a gear train, and furthermore are clearly not reversible.

De Lancey, U.S. Pat. No. 2,390,240 Nyman, U.S. Pat. No. 3,665,788 and Tschanz, U.S. Pat. No. 3,345,885 each describe variable ratio power transmitting mechanisms in which an input shaft turns a sun gear. In each case, a pair of planet gears orbit the sun gear on a yoke. A variable speed fluid drive turns the yoke around the sun gear. A ring gear concentric with the sun gear engages the planet gears. An output shaft is connected to the ring gear.

The ratio of the rotational speeds of the input and output shafts in any of these drive mechanisms can be varied by changing the rate at which the yoke rotates. These mechanisms have several inherent disadvantages which prevent their effective use as power transmissions in automotive or similar applications.

A first disadvantage of these mechanisms is that the fluid drive must work hard to provide drive ratios greater than 1:1. These drive mechanisms are most efficient when the yoke is held in a fixed orientation. A second disadvantage of these prior art transmissions is that, with the yoke held in a fixed position, the drive ratio is less than 1:1. This is because the pitch diameter of the ring gear must always be greater than the pitch diameter of the sun gear. A third disadvantage with some prior drive mechanisms is that they are not easily reversible.

French patent application publication No. 2,679,975 discloses a heavy duty transmission for driving a heavy tractor. The transmission includes a pair of epicycloidal gear trains connected in series and is adapted to provide a low speed output.

There is a need for a continuously variable continuous mesh geared transmission capable of providing at least a 1:1 drive ratio. There is a particular need for a simple compact robust transmission of this type in which the input and output shafts are coaxial.

SUMMARY OF THE INVENTION

This invention provides a transmission comprising: a first shaft mounted to be rotatable about a first axis, first and second sun gears mounted coaxially on the first shaft, a first carrier that is rotatable about the first axis, the first carrier supporting a first planet gear in meshing engagement with the first sun gear a first ring gear concentric with the first shaft and in meshing engagement with the first planet gear, a second carrier that is rotatable about the first axis, the second carrier supporting a second planet gear in meshing engagement with the second sun gear, the second carrier rigidly coupled to rotate with the first ring gear a second ring gear concentric with the first shaft and in meshing engagement with the second planet gear, a second shaft coupled to rotate with the second ring gear, and, a controller which is selectively operable to control a rate of rotation of the first carrier about the first axis to continuously vary a transmission ratio between the first shaft and the second shaft. In a preferred embodiment the second shaft is coaxial with the first shaft Rotation of the carrier can be controlled by various means. A variable speed reversible motor such as a hydraulic or electric motor is suitable. Preferably the controller comprises a variable speed motor coupled to selectively drive and brake rotation of the first carrier. The variable speed motor preferably comprises a hydraulic motor that is operable selectively as a motor and as a pump. A hydraulic pump driven by the first shaft provides fluid to drive the hydraulic motor.

Most preferably the hydraulic motor has an output shaft connected to the first carrier and the first shaft passes through an axial bore in the hydraulic motor output shaft. Preferably the hydraulic pump comprises a drive shaft connected to the first shaft and the first shaft passes through an axial bore in the hydraulic pump drive shaft. This provides a very compact drive for the first carrier which is simpler than prior systems in which a carrier is driven by a gear train. As a less preferred alternative, the motor could be separately mounted and connected to the carrier through a suitable drive means such as a gearing, a belt drive, or the like.

With a transmission as described and claimed herein it is possible utilizing a simple constant-mesh gear train to have a continuously variable transmission ratio between the input shaft and the output shaft, from a very low ratio to a high ratio or overdrive, and also to drive the output shaft selectively in a forward or reverse direction.

A preferred embodiment of the invention may be housed in a compact cylindrical housing and has input and output shafts aligned on a common axis.

BRIEF DESCRIPTION OF THE DRAWINGS

The invention will further be described, by way of example only, with reference to the accompanying drawings, wherein.

DETAILED DESCRIPTION

Figure 1:
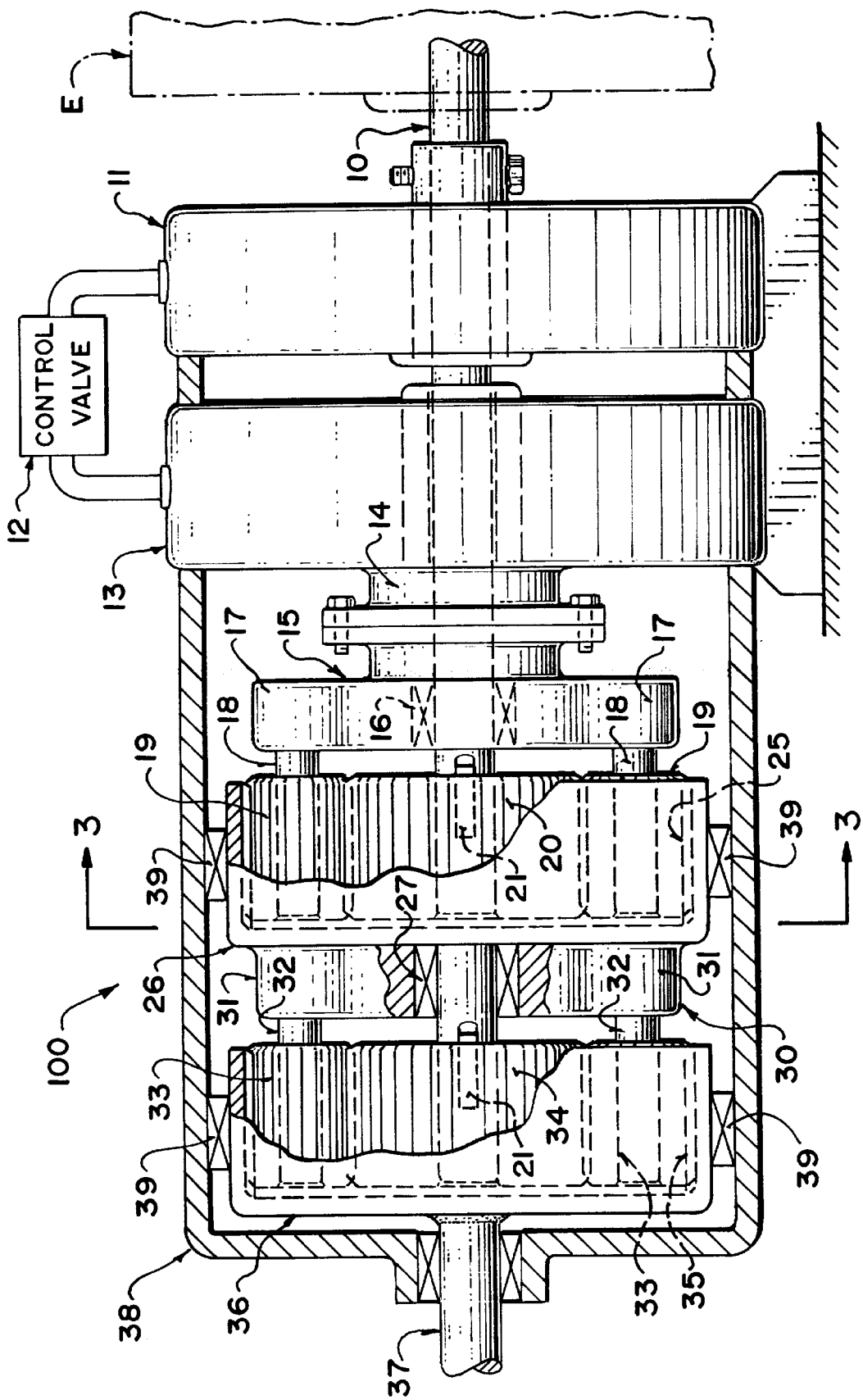
FIG. 1 is a side elevational view partly in section of a first embodiment of power transmission system according to the invention.
Figure 2:
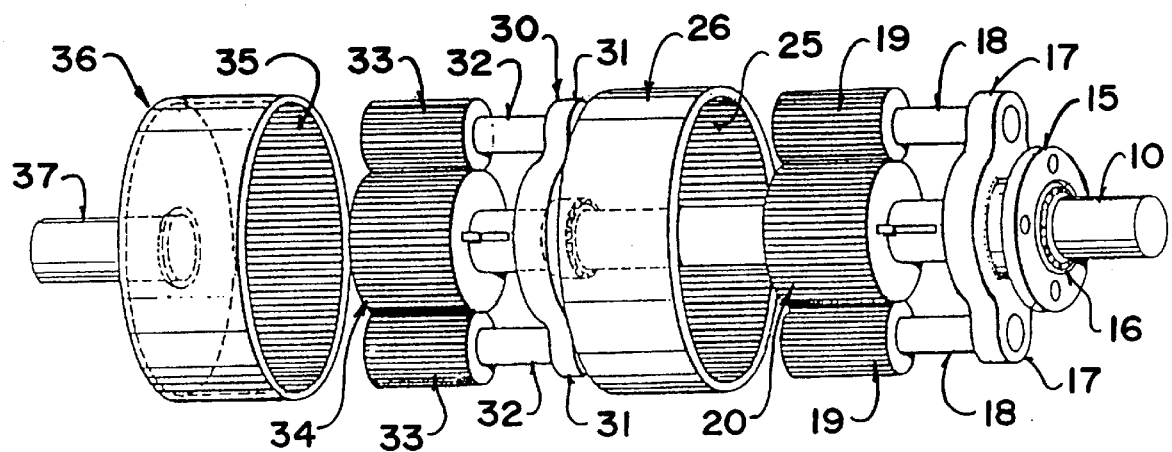
FIG. 2 is an exploded and somewhat schematic perspective view of the gear train of the transmission shown in FIG. 1.
Figure 3:
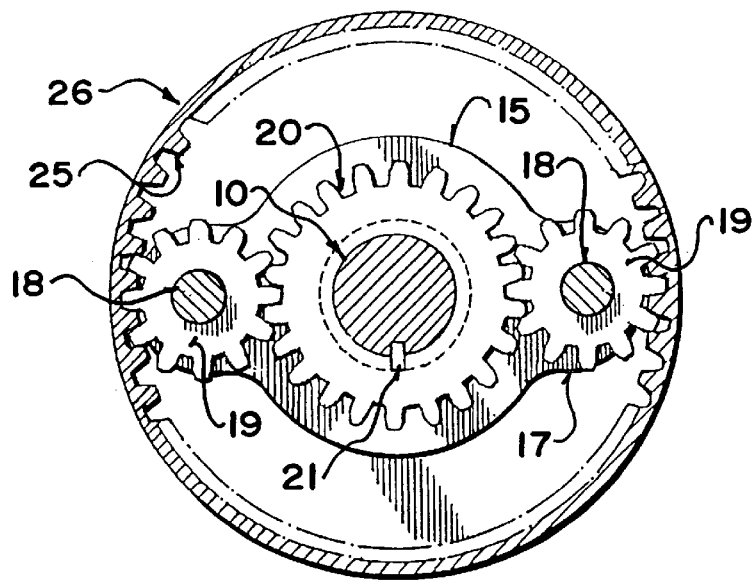
FIG. 3 is a sectional view of the gear train taken on the line III—III in FIG. 1.

FIG. 1 illustrates a power transmission 100 according to this invention suitable for use as an automotive transmission. A first shaft 10 which is illustrated as an input shaft is journalled in bearings (not shown) to rotate about a fixed axis. Input shaft 10 may be coupled directly to the crankshaft of an engine such as an automobile internal combustion engine E shown in broken lines. Input shaft 10 supports and drives a coaxially arranged hydraulic pump 11 which delivers hydraulic fluid under pressure to a control valve 12. Control valve 12 selectively delivers pressurized hydraulic fluid to drive a hydraulic motor 13 which is coaxial with the input shaft and which has an output shaft 14 that is rotatable relative to hydraulic motor 13. Control valve 12 may be operated to cause hydraulic motor 13 to rotate its output shaft 14 in either sense with respect to input shaft 10 at a variable speed.

Figure 6:
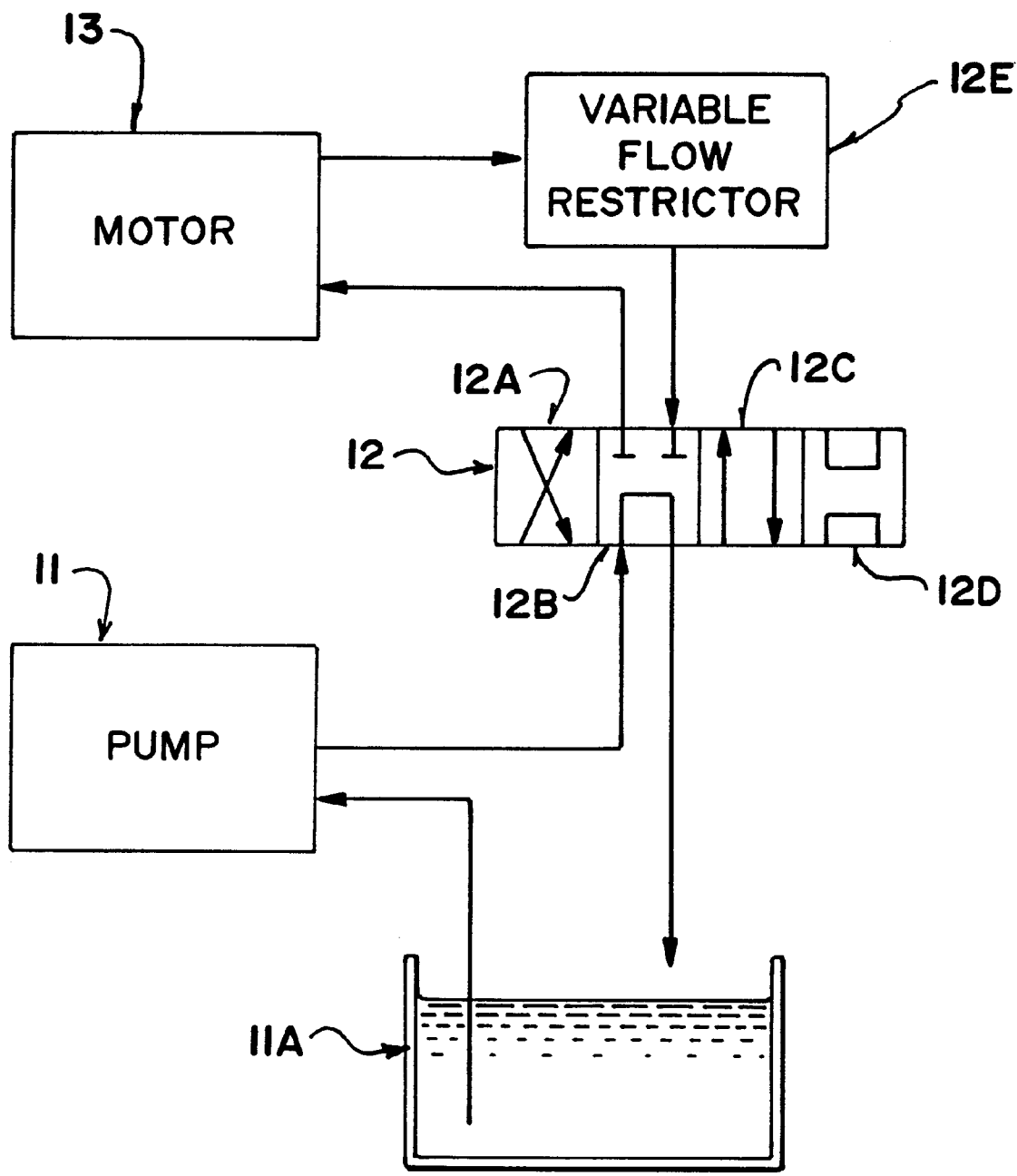

FIG. 6 shows one possible configuration of control valve 12. Control valve 12 has four sections, 12A, 12B, 12C and 12C. An operator can use a mechanical or electromechanical linkage of any known type to select which of these sections is interposed between pump 11 and motor 13. When section 12B is interposed between pump 11 and motor 13, as shown in FIG. 6, then motor 13 is prevented from rotating as there is no path for hydraulic fluid to flow through motor 13. Fluid pumped by pump 11 simply circulates through control valve 12 and reservoir 11A with a minimum of resistance.

When one of sections 12A or 12C is interposed between pump 11 and motor 13, fluid pumped by pump 11 circulates through motor 13. A variable flow control 12E is provided to vary the amount of hydraulic circulated through motor 13. The setting of flow control 12E can be adjusted by an operator. The rate of rotation of motor 13 can be adjusted by adjusting flow control 12E. The sense of rotation of motor 13 can be reversed by switching between sections 12A and 12C.

When section 12D is interposed between pump 11 and motor 13 then motor 13 can pump fluid through a loop which includes variable flow restrictor 12E. In these conditions motor 13 is not driven by pump 11. The amount of resistance that motor 13 provides to the rotation of output shaft 14 may be adjusted by changing the setting of variable flow restrictor 12E.

The output from hydraulic pump 11 is generally determined by the angular velocity of input shaft 10. Therefore, when control valve 12 is operated so that hydraulic pump 13 is driven by fluid pumped by hydraulic pump 11, the angular velocity of output shaft 14 of hydraulic motor 13 is proportional to the angular velocity of input shaft 10.

Hydraulic motor output shaft 14 is coupled to a carrier 15 which is rotatably supported coaxially with respect to input shaft 10 by a bearing 16. First carrier 15 includes two radially extending arms 17 each of which carries near its extremity an axially projecting stub shaft 18 which bears a rotatably mounted planet gear 19. Planet gears 19 mesh with a first sun gear 20 that is coaxial with input shaft 10 and is coupled to rotate therewith, for example by means of a key 21.

Planet gears 19 also are in mesh with a first annular ring gear 25 formed on the internal wall of a drum 26 which coaxially surrounds input shaft 10. Drum 26 is rotatably supported on input shaft 10 by means of a bearing 27. A second carrier 30 is integral with the drum 26. Second carrier 30 includes a pair of radially extending arms 31 each of which supports an axially projecting stub shaft 32 on which a planet gear 33 is mounted to rotate.

Planet gears 33 mesh with a second sun gear 34 that is fixed to rotate with input shaft 10. Planet gears 33 also mesh with a second internal ring gear 35 on a second drum 36. A second shaft 37, which acts as an output shaft, is coupled to second drum 36. Output shaft 37 is coaxial with input shaft 10.

Preferably first and second drums 26 and 36 are enclosed within a casing 38. Casing 38 is preferably cylindrical. Most preferably first and second drums 26 and 36 are supported on ring bearings 39. Ring bearings 39 help to stabilize first and second drums 26 and 36 so that the transmission operates smoothly. It can be appreciated that this design is capable of providing an extremely compact transmission having coaxially aligned input and output shafts (that is, shaft 10 and shaft 37 are aligned along and rotate about a common axis). Casing 38 is concentric with the input and output shafts. A cylindrical casing 38 is relatively easy to fabricate and can be made very strong as compared to more irregularly shaped housings.

Because a transmission according to the invention may be made more compact than prior art transmissions having similar capacities, a transmission according to the invention can be retrofitted in place of many types of previous transmission. In such cases, casing 38 may be fabricated so that it is the same length as a transmission being replaced. Suitable fittings (not shown) may be attached at the ends of casing 38 to enable the new transmission to be mounted to the same mounts as were used by the transmission being replaced.

From the foregoing it will be appreciated that transmission 100 comprises two epicyclic gear trains (20, 19 and 25; and 34, 33 and 35). The rate of rotation of both first carrier 15 and second carrier 30 can be controlled by adjusting the rotational speed of hydraulic motor 13. Hydraulic motor 13 directly drives carrier 15. The rate of rotation of first drum 26, to which is mounted second carrier 30, is therefore related to the rates of rotation of input shaft 10 and first carrier 15 by the following formula:

$$\omega_{c2} = \frac{T_1}{T_2}(\omega_{c1} - \omega_{in}) + \omega_{c1} \tag{1}$$

where T1 is the number of teeth on first sun gear 20; T2 is the number of teeth on first ring gear 25; $\omega_{in}$ is the angular velocity of input shaft 10; $\omega_{c1}$ is the angular velocity of first carrier 15; and $\omega_{c2}$ is the angular velocity of second carrier 30.

The rate of rotation of output shaft 37 is, in turn, dependent on the angular velocities of input shaft 10, and second carrier 30 as well as the ratio in the pitch diameters of second sun gear 34 and second ring gear 35 by the same formula. The relationship between the angular velocity of output shaft 37 and the angular velocities of input shaft 10 and first carrier 15 is therefore given by:

$$\omega_{out} = (\omega_{c1} - \omega_{in}) \times \left(\frac{T_1 T_3}{T_2 T_4} + \frac{T_3}{T_4} + \frac{T_1}{T_2}\right) + \omega_{c1} \quad (2)$$

wherein T3 is the number of teeth on second sun gear 34; T4 is the number of teeth on second ring gear 35; $\omega_{in}$ and $\omega_{c2}$ are as defined above; and, $\omega_{out}$ is the angular velocity of output shaft 37.

It can be appreciated from the foregoing that the transmission ratio between the rates of rotation of output shaft 37 and input shaft 10 can be smoothly varied by changing the ratio between the angular speed of input shaft 10 and the speed of hydraulic motor output shaft 14. This is in contrast to conventional epicyclic gear trains where gear ratios are changed stepwise e.g. by selectively immobilizing a sun gear, a planet carrier, or a ring gear drum.

In the embodiment illustrated in FIG. 1, the pitch diameters of the sun gears 20 and 34 are identical, as are the pitch diameters of the planet gears 19 and 33 and of the ring gears 25 and 35. Of course, this is by way of example only. For a planetary gear system of this configuration, and wherein the pitch diameter of the sun gears 20, 34 is one half the pitch diameter of the ring gears 25, 35, it can be seen that the equation of motion can be expressed as follows:

$$\omega_{out} = \frac{9}{4}\omega_{c1} - \frac{5}{4}\omega_{in} \quad (3)$$

Equation (3) demonstrates the useful feature that making a small change in the rate of rotation of first carrier 15 makes a much larger change in the rate of rotation of output shaft 37.

The relative diameters of the sun gears and ring gears may be varied in a transmission according to the invention. For many applications it is preferred that sun gears 20 and 34 have pitch diameters about half of the pitch diameters of ring gears 25 and 35. This permits a transmission 100 to be very compact and reduces the expenses associated with large diameter ring gears. Furthermore, as described below, in a transmission 100 in which the sun gears and ring gears are in a ratio of about 2:1 the overall output ratio of the transmission 100 during its most efficient operation is about 1:1.

It can be seen from equation (3) above that output shaft 37 may be made stationary (i.e. $\omega_{out}=0$) by maintaining:

$$\omega_{c1} = \frac{5}{9} \times \omega_{in} \quad (4)$$

In this "driving neutral" condition first carrier 15 turns at roughly (but not exactly) ½ the speed of input shaft 10. As the speed of rotation of first carrier 15 relative to that of input shaft 10 departs from this value, then output shaft 37 will be rotated (in one direction or the other) initially at a very low ratio, which will increase the further the departure.

From Equation (3) it will also be seen that when carrier 15 is held against rotation ($\omega_{c1}=0$), then the angular velocity speed of output shaft 37 relative to input shaft 10 is expressed as:

$$\omega_{out} = \frac{5}{4}\omega_{in}. \quad (5)$$

The negative sign indicates that output shaft 37 rotates in the opposite direction to input shaft 10. Carrier 15 may be held against rotation by operating control valve 12 to block fluid flow to or from hydraulic motor 13 so that output shaft 14 is prevented from turning. Transmission 100 is at its most efficient when first carrier 15 is held still.

When carrier 15 is rotated at the same angular velocity in the same direction as input shaft 10, then output shaft 37 has an angular velocity expressed as follows:

$$\omega_{out}=\omega_{in} \quad (6)$$

When carrier 15 is counter-rotating at the same speed as input shaft 10 ($\omega_{c1}=-\omega_{in}$) then the angular velocity of output shaft 37 is expressed as follows:

$$\omega_{out}=3\tfrac{1}{2}\times\omega_{in} \quad (7)$$

From the foregoing explanation and from a consideration of the drawings it will be appreciated that the speed and direction of rotation of output shaft 37 relative to input shaft 10 can be varied continuously by varying the speed of rotation of carrier 15. It can also be appreciated that a transmission 100 as described herein can provide a 1:1 transmission ratio without requiring hydraulic motor 13 to turn carrier 15 any faster than one half of the angular speed of input shaft 10. This is an improvement on those prior art transmissions in which a planetary gear carrier must be driven at relatively high angular speeds to provide a 1:1 output ratio. It can further be appreciated that all of the foregoing may be accomplished while maintaining a 2:1 ratio in the diameters of sun gears 20 and 34 to ring gears 25 and 35 respectively.

Figure 4:
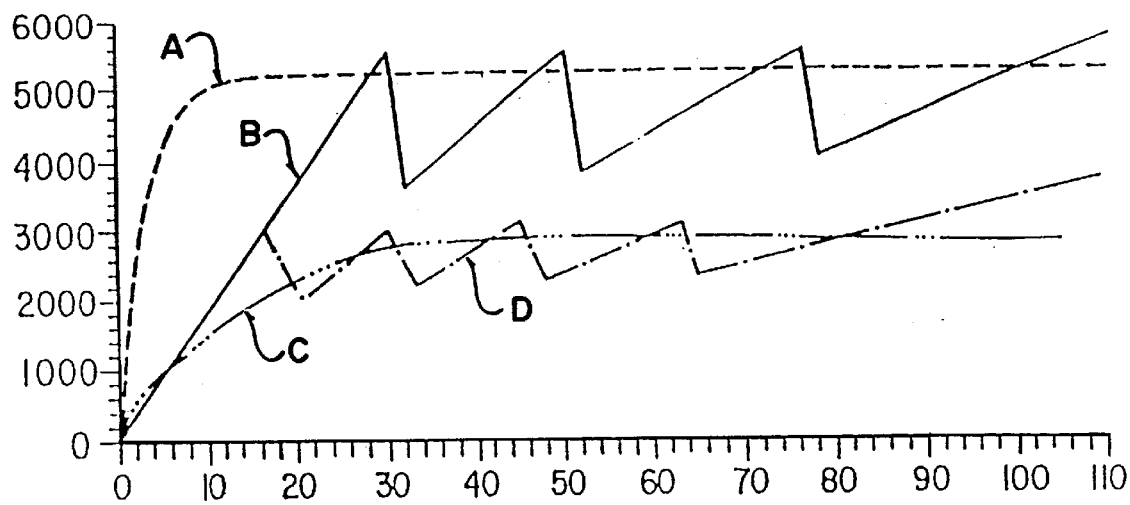
FIG. 4 is a graph representing the performance of the system as compared to a conventional automotive power transmission system.

The power curve for an automotive transmission 100 embodying the present invention can be smooth and continuous. This is illustrated by the graph of FIG. 4 which compares the operation of the continuously variable transmission 100 of the present invention to that of a conventional transmission in both a high output high performance situation, and in an average output situation. In FIG. 4, curve A represents the relationship of engine speed to the road speed of a vehicle for maximum performance of an engine that produces its top power output at slightly over 5,000 rpm. It will be seen that from a standstill, the engine speed climbs rapidly and smoothly to its maximum power range, and the transmission then operates continuously at the maximum power range without any interruption as the vehicle speed increases.

In contrast, curve B shows the performance of a typical prior art geared transmission, showing the characteristic sawtooth profile as the transmission is changed successively from first through second and third to fourth gear. It will be noted that, as compared to curve A, curve B shows that the conventional transmission initially takes longer to reach the peak power output level of the engine, and remains there only briefly at the top end of the range of each of the first, second and third gears.

To summarize, as demonstrated by the curves A and B, the transmission of the present invention allows the engine to operate at maximum power output substantially all of the time, while the conventional transmission inherently prevents the engine operating at full power output for much of the time.

In an automotive application the novel transmission could alternatively be used to enable the engine to be operated at lower speeds and thus achieve economies in fuel efficiency as compared to the conventional transmission. This condition is represented by curve C in FIG. 4 for the applicant's transmission and by curve D for a conventional gear shift transmission.

Also of importance in applicant's novel transmission is the fact that the gears remain at all times fully in mesh with one another. With conventional gear change transmissions, particularly in heavy duty applications such as in auto racing, gear shifting is a common cause of transmission and drive train failure.

Figure 5:
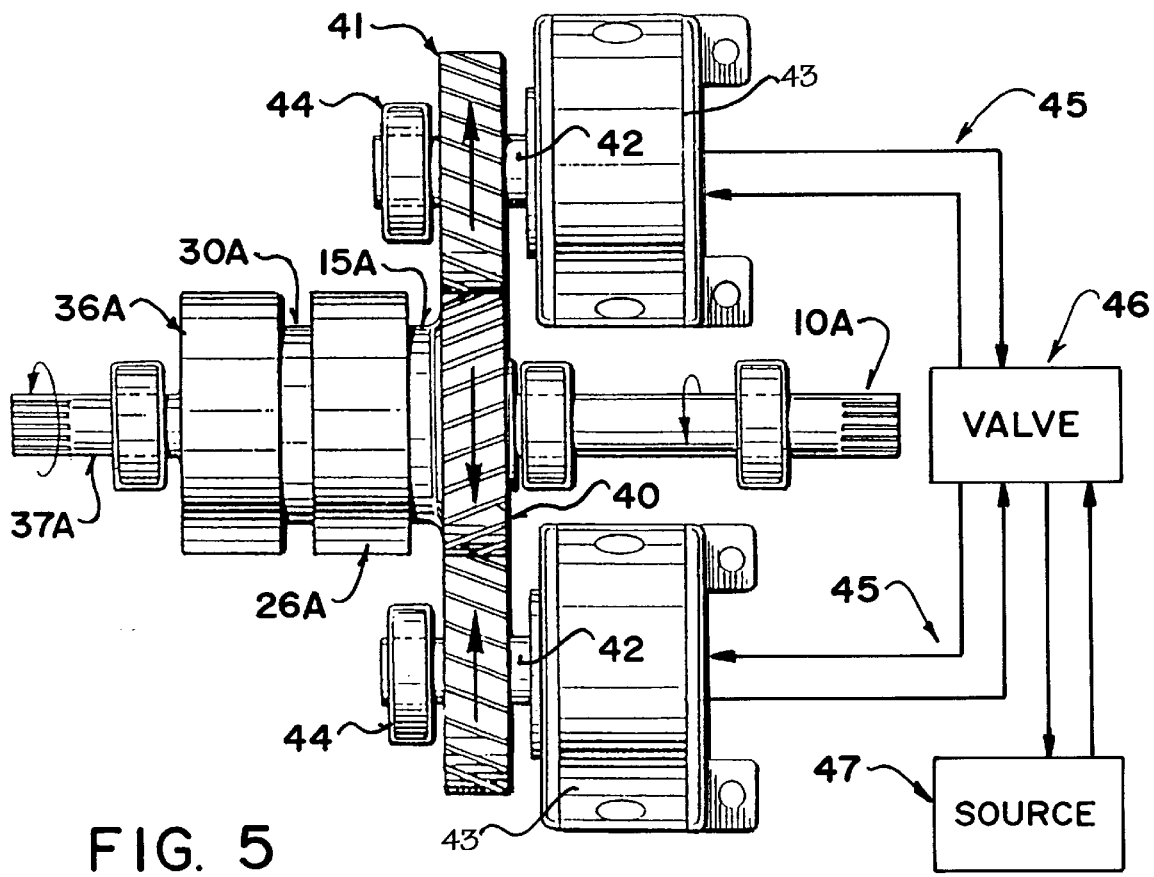
FIG. 5 is a view corresponding to FIG. 1 showing a second embodiment of the transmission system; and, FIG. 6 is a schematic view of a valve system for controlling the transmission of FIG. 1.

FIG. 5 shows a transmission 110 according to an alternative embodiment of the invention. Transmission 110 is in many respects similar to transmission 100 of FIG. 1, including as it does an input shaft 10$a$ coaxial with an output shaft 37$a$ interconnected through two stages of epicyclic gearing including a first planet carrier 15$a$, a first drum 26$a$ to which is attached a second planet carrier 30$a$, a second drum 36$a$ being fixed to rotate with the output shaft 37$a$. The internal gearing of the two epicyclic gear trains is not shown since it is functionally identical to the arrangement shown in FIG. 1.

The first planet carrier 15$a$ is as before mounted for rotation relative to the input shaft 10$a$ on a bearing (not shown). Carrier 15$a$ has fixed to rotate therewith a gear 40 which meshes on opposite sides thereof with gear pinions 41 each carried on a shaft 42 of a hydraulic machine 43, mounted at a fixed orientation relative to the input shaft 10. As shown, each shaft 42 is parallel to input shaft 10$a$ and is carried in a bearing 44. Each hydraulic machine 43 is connected in a hydraulic circuit schematically illustrated at 45, and under the control of a valve 46 can function selectively as a pump or as a motor. Hydraulic pump/motors 43 can be utilized to control the rotation of the carrier 15$a$ to produce any desired output transmission ratio between the input shaft 10$a$ and the output shaft 37$a$.

Valve 46 can condition the hydraulic machines 43 into three basic modes. In a first mode, the hydraulic machines act as pumps. In this mode, hydraulic machines 43 retard the rotation of gear 40 as they pump fluid in one direction against a resistance controlled by valve 46. In the second mode, pressurized fluid from a source 47 of pressurized fluid flows through the machine 43 in the opposite direction so that it acts as a motor. In this mode, hydraulic machines 43 drive the rotation of gear 40 at an angular velocity determined by the rate of fluid flow through machines 43. The rate of fluid flow from source 47 through machines 43 is controlled by valve 46. In the third mode, valve 46 is set to prevent any fluid flow through machines 43 is prevented so that its shaft and the associated pinion 41 are held against rotation.

It can be appreciated that the embodiment of FIG. 5 is functionally identical to that of FIG. 1 with the exception that a single hydraulic motor 13 has been replaced by a pair of hydraulic machines 43 and the pressurized fluid for driving hydraulic machines 43 comes from a source 47 which is not necessarily a hydraulic pump driven by input shaft 10 as is hydraulic pump 11.

Referring back to the equation of motion discussed above, when input shaft 10$a$ is driven and valve 46 places machines 43 in their lock-up condition ($\omega_{c1}$=0) then output shaft 37$a$ will be driven 25% faster than, and in the reverse direction to, input shaft 10$a$.

If valve 46 is now shifted to allow the machines 43 to operate in their pump mode, then the reaction forces in the transmission will cause a torque on carrier 15$a$ which will cause carrier 15$a$ to rotate in the same direction as input shaft 10$a$. Carrier 15$a$ will rotate at a speed such that the torque being applied to gear 40 by pinions 41 is equal and opposite to the torque generated by the transmission reaction forces. The braking torque being applied to gear 40 by pinions 41 is determined by the resistance in the fluid circuit 45 of machines 43. Thus, in this mode machines 43 act as brakes controlling the rotation of the carrier 15$a$ that is induced by the reaction forces in the transmission. By varying the braking effect with valve 46, the speed of rotation of carrier 15$a$ relative to input shaft 10$a$ can be varied and thus the transmission ratio between input shaft 10$a$ and output shaft 37$a$ can be continuously varied. When the hydraulic resistance in machines 43 is reduced to a minimum, carrier 15$a$ operates in a virtually free-wheeling mode, and the rotation of output shaft 37 is minimized, the transmission ratio of the gear accordingly being extremely low.

If the speed of rotation of carrier 15$a$ is driven by hydraulic machines 43 (acting as motors) so that it matches and then exceeds ⅘ the speed of rotation of the input shaft 10$a$ in the same direction, output shaft 37$a$ will pass through a stationary condition and then begin to rotate in the same direction as input shaft 10$a$ (i.e. in reverse to the previous direction of the output shaft) at a very low transmission ratio.

From the lock-up condition, if the valve 46 is manipulated to supply power to overcome the reaction forces in the transmission and drive carrier 15$a$ to rotate in a direction opposite to that of input shaft 10$a$, then output shaft 37$a$ will be driven (in the direction opposite to that of input shaft 10$a$) at a speed higher than that of input shaft 10$a$, and the transmission ratio would increase in proportion to the speed of rotation of the carrier 15$a$. However operating the transmission in this mode would consume very high amounts of power in the hydraulic machines 43 (acting as motors), and for most applications would be impractical.

It will be understood that in the embodiments described the functions of the input and output shafts can be reversed.

From the foregoing description it will be appreciated that the actual gear transmission involved can vary widely, but will embody four main characteristics, namely that (a) the transmission relies on a positive gear drive and not a friction drive, (b) the gears remain in mesh at all times; (c) the gear ratio of the transmission is varied continuously by rotation of a carrier element; and (d) the transmission includes a pair of epicyclic gear trains having sun gears mounted on a common shaft, wherein a ring gear in a first one of the epicyclic gear trains drives a planet gear in the second epicyclic gear train.

The transmission as described in the foregoing embodiments constitutes a power transmission which may be utilized in an automobile or the like. The transmission of course could also be used in various other equipment, particularly in tractors and locomotives and the like, and in particular could be most advantageously applied in providing the drive to tracked vehicles. Typically, in tracked vehicles steering is effected by interrupting the drive from the power source to one track while continuing to deliver power to the other track, so that tracked vehicles commonly are provided with an independently actuated clutch and brake in the power train to each of the right hand side track and the left hand side track. By providing a power transmission in accordance with any of the above described embodiments in the drive transmission to each of the tracks of a tracked vehicle, one can in very simple manner vary the speed ratio between the engine of the vehicle and each of the two tracks independently. Indeed by suitable manipulation of the drive to the carriers of the two transmissions, one could have the tracks on opposite sides of the vehicle moving in opposite directions, which would produce very rapid steering actions compared to the conventional mode of steering of such vehicles.

Versions of the above described power transmissions are suitable for use with many different types of engines such as conventional, petrol or diesel engines and the like, and are particularly suitable for use with engines such as turbines which operate efficiently only at one speed level. Coupled to a transmission of the type described above, a turbine engine can be used and operated at a substantially constant speed e.g. in an automobile while providing a continuously varying gear ratio, from very low ratio for starting, to intermediate and high ratio drive.

The described transmission could be made suitable for use in locomotives which require a wide range of transmission ratios from very low for starting trains which may have a mass of several thousand tons, to very high, for moving trains at sustained high speeds. The novel transmission would make feasible the use of turbines as prime movers in locomotives.

The improved transmission could also be made suitable for use in marine applications, typically in conjunction with turbine engines.

In these or in other suitable cases, control of the planet carrier could be effected by means of a separate internal combustion engine.

As well as providing a power transmission, the transmission could also be used in applications where merely a speed change ratio is required. Furthermore the transmission would also appear to have potential application as a braking system since, as will be appreciated, suitable manipulation of the carrier can negate the rotation of the input shaft so that the output shaft is stationary.

As will be apparent to those skilled in the art in the light of the foregoing disclosure, many alterations and modifications are possible in the practice of this invention without departing from the spirit or scope thereof.

For example, while hydraulic pump 11 and hydraulic motor 13 have been described as being coaxial with input shaft 10, it can be appreciated that hydraulic motor 13 could be separately mounted and coupled to carrier 15 with a suitable drive means such as a gearing, a belt drive, or the like. This is not preferred. The coaxial arrangement of hydraulic pump 11 and hydraulic motor 13 is an inventive way to make a very compact transmission which avoids any additional drive means between hydraulic motor 13 and carrier 15.

While the above discussion has described carrier 15 as being driven and braked by a hydraulic motor 13, an alternative control means could be used to control the rotation of carrier 15 relative to input shaft 10. For example, hydraulic motor 13 could be replaced with a variable speed electric motor or hydraulic motor 13 and hydraulic pump 11 could both be replaced with a suitable continuously variable transmission connected between input shaft 10 and carrier 15. If an electric motor is used in place of hydraulic motor 13 then it is necessary to ensure that first carrier 15 can be braked. This may be done, for example, by providing a separate brake on carrier 15.

While carrier 15 has been described as carrying two planet gears 19, carrier 15 could carry one or more planet gears.

If no reverse is required and no overdrive is required then pump 11 (or source 47) may be omitted. Motor 13 (or hydraulic machines 43) can then act simply as brakes. In this case the output can be varied from about 1:1 in the locked up condition to neutral with first carrier 15 or 15a free wheeling.

Accordingly, the scope of the invention is to be construed in accordance with the substance defined by the following claims.

What is claimed is:

1. A transmission comprising:
   (a) a first shaft mounted to be rotatable about a first axis and carrying a coaxial first sun gear and a coaxial second sun gear;
   (b) a first carrier that is rotatable about the first axis, the first carrier supporting a first planet gear in meshing engagement with the first sun gear;
   (c) a first ring gear concentric with the first shaft and in meshing engagement with the first planet gear;
   (d) a second carrier that is rotatable about the first axis, the second carrier supporting a second planet gear in meshing engagement with the second sun gear, the second carrier rigidly coupled to rotate with the first ring gear;
   (e) a second ring gear concentric with the first shaft and in meshing engagement with the second planet gear;
   (f) a second shaft coupled to rotate with the second ring gear; and,
   (g) a controller which is selectively operable to control a rate of rotation of the first carrier about the first axis to continuously vary a transmission ratio between the first shaft and the second shaft.

2. The transmission of claim 1 wherein the second shaft is coaxial with the first shaft.

3. The transmission of claim 1 wherein the controller comprises a variable speed motor coupled to selectively drive and brake rotation of the first carrier.

4. The transmission of claim 3 wherein the variable speed motor comprises a hydraulic motor that is operable selectively as a motor and as a pump.

5. The transmission of claim 4 wherein the hydraulic motor is coupled to be driven as a motor by fluid supplied from a hydraulic pump driven by the first shaft.

6. The transmission of claim 5 comprising a control valve connected between the hydraulic pump and the hydraulic motor, the control valve selectively operable to lock the hydraulic motor and the first carrier against rotation, to brake rotation of the first carrier or to drive rotation of the first carrier.

7. The transmission of claim 6 wherein the hydraulic motor has an output shaft connected to the first carrier wherein the first shaft passes through an axial bore in the hydraulic motor output shaft.

8. The transmission of claim 7 wherein the hydraulic pump comprises a drive shaft connected to the first shaft, wherein the first shaft passes through an axial bore in the hydraulic pump drive shaft.

9. The transmission of claim 7 wherein the second shaft is coaxial with the first shaft.

10. The transmission of claim 7 wherein the first and second sun gears are equal in diameter.

11. The transmission of claim 10 wherein the first and second ring gears are equal in diameter.

12. The transmission of claim 11 wherein a ratio of a diameter of the first ring gear to a diameter of the first sun gear is 2:1.

13. The transmission of claim 1 wherein the first and second shafts are aligned along a common axis.

14. The transmission of claim 13 wherein the controller comprises a hydraulic motor connected to a hydraulic pump in a fluid circuit and wherein the hydraulic motor has an output shaft connected to the first carrier, the first shaft passes through an axial bore in the hydraulic motor output shaft and the hydraulic pump is mounted coaxially with and driven by the first shaft.

15. The transmission of claim 14 wherein the transmission is contained within a cylindrical housing.

16. The transmission of claim 15 wherein the housing is concentric with the common axis.

17. The transmission of claim 16 wherein the first and second ring gears are each supported by ring bearings which are supported by an inner surface of the housing.

* * * * *